June 12, 1928.
C. T. REISZ
1,673,422
PORTABLE TESTING SET FOR MEASURING LINE INDUCTION
Filed May 22, 1926
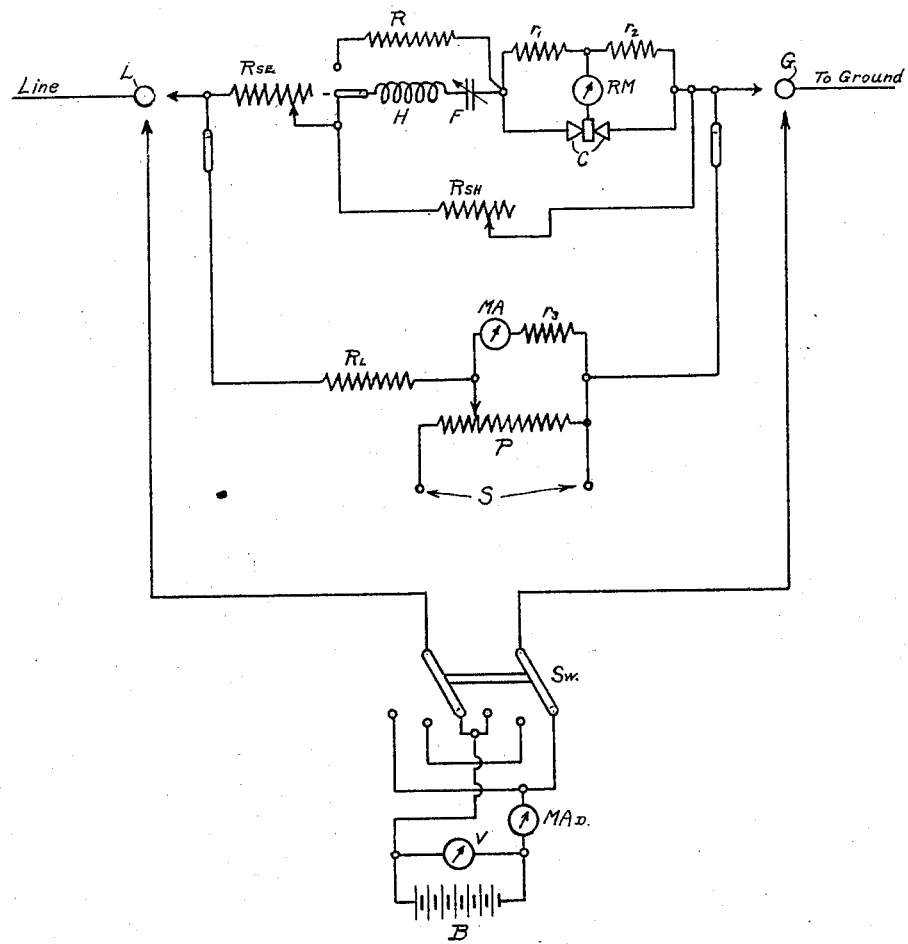
Inventor
Charles T. Reisz
By Eugene E. Brown
Attorney Patented June 12, 1928.

1,673,422

UNITED STATES PATENT OFFICE.

CHARLES T. REISZ, OF CHICAGO, ILLINOIS, ASSIGNOR TO THE WESTERN UNION TELEGRAPH COMPANY, OF CHICAGO, ILLINOIS, A CORPORATION OF ILLINOIS.

PORTABLE TESTING SET FOR MEASURING LINE INDUCTION.

Application filed May 22, 1926. Serial No. 111,041.

My invention, in its broad aspect, relates to a method of, and apparatus for, measuring and analyzing alternating currents. Specifically, it concerns testing apparatus for investigating the induction of power systems.

It is the object of this invention to provide a practicable circuit for measuring alternating current inductive disturbances at a point in the line conductor remote from the point at which the disturbance originates.

It is a feature of my invention that in analyzing and measuring the alternating current in the line conductor, a coil and a condenser are provided and adjusted to resonance with the current to be measured and that the resonance current is then rectified prior to its application to the measuring instrument.

The test set of my invention avoids the drawbacks of previously known systems for measuring inductive disturbances, such as the taking of readings from an indicating meter,—a procedure which is subject to the personal element and becomes monotonous for the reader when extended over long periods.

My invention provides means for calibrating the direct current recording meter, either with alternating current, which may be of the same frequency as the induction to be tested, or with direct current.

Other advantages of the method and apparatus of my invention will be apparent from the following description by reference to the annexed drawing, which shows a preferred form of the invention wherein:

L represents the terminal of a line conductor subject to the power induction which is to be investigated. The line conductor may be any conductor within the field of influence of the power line the inductive effect of which it is desired to investigate. It may be a special test conductor or it may be a conductor normally used for telegraphic or other purposes. G represents the terminal of a ground connection. These terminals may be any convenient means, such as jacks, by which connection may be made to line and to ground.

A direct current recording meter RM, is connected in the diagonal of a double rectifier made in the form of a balanced bridge, the arms of which include respectively, resistances $r_1$ and $r_2$, and crystals C, the latter connected in the arms in opposite directions, as shown. This arrangement is connected in series with a resonant path including a coil and a condenser made variable for purposes of tuning. In order to provide for an adjustment of the magnitude of the current, regulating resistances $R_{SE}$ and $R_{SH}$ are connected, the former in series, and the latter in shunt, with the combination of double rectifier and tuning impedance.

For purposes of calibration, the circuit of the test set includes apparatus for measuring the resistance of the line conductor external to the set. This includes a reversing switch $Sw$ for connecting battery B between line and ground, by way, if desired, of the previously mentioned terminals L and G. A voltmeter V connected across the line, and a direct current milliammeter $MA_D$ connected in series in the line give readings from which the resistance of the line may be calculated by the "IR drop".

Actual calibration is accomplished by certain other apparatus adapted for connection across the terminals L, G of the measuring circuit. This additional apparatus is made up of a potentiometer P connected to the source of test current S, a milliammeter MA and series resistance $r_3$, connected between the output terminals of the potentiometer, and a resistance $R_L$, connected between line and potentiometer, and equal in magnitude to the calculated, or otherwise predetermined, resistance of the line.

Where alternating current is not available for calibration, direct current may be used. In this case, it is necessary to replace the tuning impedance by a resistance which corresponds to the effective resistance of the coil at the frequency to be tested. The use of alternating current for calibration is, however, preferred.

The method of operation of the system in measuring the induction will be apparent from the following:

The resistance of the line conductor external to the testing set is determined by connecting the meter and its associated circuits to line and ground, through terminals L and G. In order to eliminate any constant earth potential effects, readings are taken with the reversing switch in both positions. After calculation of the resistance from the voltmeter and milliammeter readings, the resistance $R_L$ is set at the calculated value.

The above preliminaries completed, actual calibration is then accomplished by either of the two methods mentioned, with alternating current or with direct current. If an alternating current light circuit of the same frequency as the induction to be tested, is available, this may be used in calibration. The potentiometer is adjusted to a desirable setting. The condenser F is then varied until a maximum deflection on the recording direct current milliammeter is obtained. This indicates the condition of resonance for the current to be measured.

Since the crystals are connected in the double rectifier in opposite directions, it is evident that the crystals operate, each one as a shunt about its corresponding resistance, during alternate half waves of the alternating current. Accordingly, current pulses of a frequency equal to twice the frequency of alternation of the current to be measured, will be transmitted through the direct current recording meter, always in the same direction.

The shunt and series resistances are adjusted for the magnitude of the induction, and calibrating is performed between alternating current milliammeter MA and the recording meter RM, using the previously determined resistance of the line to compensate for the drop in voltage over the circuit to be tested. After calibration, the test source S is disconnected from the recording meter and its associated apparatus by opening the two switches shown connected to the outer terminals of resistances $R_L$ and $r_3$. The line conductor is then connected to the line jack and the ground to ground jack, at L and G respectively, whereupon alternating current derived in the line conductor by induction from a neighboring power line is caused to pass through the test set. If necessary, readjustment of the variable tuning element, as condenser F, is made until the line conductor is in resonance with the induced alternating current. This is evidenced, as before, by a maximum reading on the recording meter RM. Since the meter has already, by connection to test source S, been calibrated, in terms of power induction units if desired, it is obvious that the reading of the meter will give a direct measurement of the power induction in the line conductor.

Where calibration is performed with direct current, instead of alternating current, the resistance R is connected to the double rectifier, H and F being temporarily removed from circuit. Calibration is made on both polarities and the results averaged. When calibration is complete, resistance R is disconnected, and the tuning impedance is put into the circuit and tuned while actually measuring the induction.

It is obvious that various modifications may be made in the method and apparatus of my invention without departing from the spirit of the invention. Accordingly, I do not limit myself to the precise arrangement disclosed, but claim as my invention all arrangements coming within the scope of the annexed claims.

What I claim is:

1. In apparatus for investigating the alternating current induction in a line conductor, a test set adapted to be connected in series with said line conductor comprising means for tuning said line conductor to resonance with the current to be measured, and means for rectifying said current.

2. In apparatus for measuring alternating current induction in a line conductor, a test set comprising a coil and a condenser adjustable to tune the line conductor to resonance with the current to be measured, and means for rectifying and measuring both half-waves of said alternating current.

3. In apparatus for investigating the induction in a line conductor, the combination of an indicating instrument, a source of test current, impedance elements including a coil and a condenser with means to vary one of said elements for tuning, and means to connect said test current source and said line conductor alternately to said indicating instrument through one or more of said impedance elements.

4. The method of measuring alternating current induction in a line conductor which comprises augmenting the induction currents by establishing a condition of electrical resonance therefor, and measuring the augmented current.

5. The method of measuring alternating current induction in a line conductor which comprises varying the amplitude of the induction until it attains a maximum, rectifying the varied current and measuring the rectified current.

6. In a system for measuring alternating current in a line conductor, means to tune the line to the frequency of the alternating current, a direct current measuring instrument and a rectifying means, and in combination therewith, calibrating means for the measuring instrument comprising a source of alternating test current and means to connect said test current source to said measuring instrument through said rectifying means.

7. In a system for measuring alternating current in a line conductor, means to tune the line to the frequency of the alternating current, a direct current measuring instrument and a rectifying means, and in combination therewith, calibrating means for the measuring instrument comprising a source of alternating test current, an artificial line corresponding in impedance to the line conductor, and means to connect said test current source to said measuring instrument through said artificial line, said rectifying and said tuning means.

8. In a system for investigating the induction originating at a distant point in a line conductor, the combination of means for determining the normal impedance of the line conductor, means for tuning the line conductor to obtain a minimum impedance at the induction frequency, a rectifying circuit, a direct current measuring instrument connected to said rectifying circuit, and a calibrating circuit through said tuning means, said rectifying circuit and said measuring instrument comprising a source of test current of the induction frequency and an artificial line adjustable to the value of the normal line impedance.

9. In a system for measuring power induction in a line conductor, the combination of a direct current measuring instrument, a rectifying circuit to the direct current terminals of which said instrument is connected, a path connected to said rectifier circuit comprising impedance elements adjustable to resonance at the induction frequency, and resistance means connected to a terminal of the resonant path for regulating the amplitude of the rectified current.

10. In a system for measuring power induction in a line conductor, the combination of a direct current measuring instrument, a double rectifier to the direct current terminals of which said instrument is connected, a means between the line conductor and the rectifier comprising an inductance coil and a condenser adjustable to tune the line conductor to resonance at the induction frequency, means for passing an alternating test current through said tuning means and said rectifier, and means for calibrating said instrument by means of said test current.

In testimony whereof I affix my signature.

CHARLES T. REISZ.